United States Patent [19]

Bartelink

[11] 4,390,750
[45] Jun. 28, 1983

[54] REMOTE SUPERVISORY SYSTEM

[76] Inventor: Everhard H. B. Bartelink, 15 Ridge Rd., Concord, N.H. 03301

[21] Appl. No.: 131,444

[22] Filed: Mar. 18, 1980

Related U.S. Application Data

[63] Continuation of Ser. No. 926,102, Jul. 19, 1978, abandoned.

[51] Int. Cl.³ .......................................... H04M 11/04
[52] U.S. Cl. .................................... 179/5 R; 179/2 A
[58] Field of Search .......... 179/5 R, 5 P, 2 A, 2 AM, 179/18 B, 27 DB

[56] References Cited

U.S. PATENT DOCUMENTS 3,299,211 1/1967 Avery et al. ......................... 179/5 R
3,492,426 1/1970 Foreman et al. .................... 179/5 R
3,700,823 10/1972 Chwlak .............................. 179/18 B

FOREIGN PATENT DOCUMENTS 168320 8/1959 Sweden.

Primary Examiner—Joseph A. Popek
Attorney, Agent, or Firm—Cesari and McKenna

[57] ABSTRACT

A remote supervisory system operating in conjunction with a telephone company central office to enable monitoring of a subscriber's premises over existing telephone circuits. Auxiliary equipment at the subscriber's premises is coupled to the subscriber's telephone circuit and includes sensors which monitor the condition of the premises. If an abnormal condition occurs at the premises, the condition is sensed by one of the sensors and the equipment, in response thereto, creates a temporary off-hook condition on the circuit, transmits to the central office alarm report signals indicative of the abnormality, and then goes back on-hook. The central office identifies the subscriber as it does in the case of a normal outgoing call, senses the transmitted alarm report signals and stores the signals and subscriber's identity in its memory. The central office may be equipped to initiate a call to a predesignated action center to report the subscriber's identity and nature of the alarm. The auxiliary equipment may also be adapted to report periodically to the central office rather than only in the case of abnormality, and may include command receivers and a recording unit which receive commands and messages over the circuit.

61 Claims, 2 Drawing Figures

REMOTE SUPERVISORY SYSTEM

This is a continuation of application Ser. No. 926,102, filed July 19, 1978, now abandoned.

BACKGROUND OF THE INVENTION

This invention relates generally to supervisory systems and, more particularly, to an improved remote supervisory system that utilizes existing telephone company circuits and equipment for monitoring and reporting the existence of alarm conditions at a telephone subscriber premises and for enabling subscribers to exercise control functions at, and to transmit messages to, their premises from remote locations.

In many cases, it is desirable to provide continuous supervision of certain premises, such as homes, leisure homes, offices and the like, during the absence of those who normally occupy them. If any abnormal conditions exist at the premises, it is desirable that these conditions be reported to some entity which can take corrective action. It has been recognized that one possible solution to this problem is to use the existing telephone circuits over which the subscriber receives telephone service as the means for transmitting alarm reporting signals. At least two basic methods have heretofore been contemplated or used to provide this kind of supervision over the telephone networks.

In a first method, any abnormal condition at the subscriber location causes specially designed auxiliary equipment there to create an off-hook condition on the subscriber's circuit. Upon sensing and recognizing that a dial tone has been received on the circuit, the auxiliary equipment automatically dials a number which has been designated to receive the alarm reports. The equipment must then make sure that the connection to the called number has been completed. Thereafter, it must transmit the identification of the subscriber and the nature of the emergency. If the number which has been designated to receive the alarm report is busy, the whole sequence has to be repeated until this number has been reached.

The disadvantages of the first method lie in the additional complexity of having the auxiliary equipment detect and recognize dial tone, busy signals and call completion, and of having it store and transmit the number designated to receive the alarm reports and the customers identification number. Also, if the number designated to receive the alarm report is busy, the method fails to meet the general requirement that alarm conditions be forwarded to a location which is remote from the supervised premises at the earliest possible moment. Some emergencies, such as fire, can cause the destruction of the auxiliary equipment at the subscriber's premises and/or destruction of the subscriber's telephone line before the report is ever made.

In a second method, the telephone company central office equipment is modified so that it periodically transmits an interrogation signal over the telephone circuits of those subscribers that have requested the remote supervisory service. Reception of the interrogation signal at the subscriber location activates specially designed auxiliary equipment there which interrogates various alarm condition sensors at the premises, and which transmits signals over the subscriber's circuit that are indicative of the conditions at the premises. The interrogation signals are used to initiate a temporary off-hook condition and to activate the condition sensing and reporting auxiliary equipment at the subscriber's premises. The interrogation signals used in systems of this type must be different from the signals which are normally generated in the course of completing any call to the subscriber's location by the central office equipment. The interrogation signals may, for example, be in the form of an abnormally high DC voltage or a specially coded AC signal which is applied to the subscriber's circuit by the central office equipment. Because of the need for these special interrogation signals, special apparatus, such as bridging relay contacts or the like, is required at the central office to obtain access to the subscriber's circuit. The need for such special circuit accessing apparatus represents an objectionable complication at the central office.

It would be highly desirable if a telephone circuit supervisory system were available which did not have the complexity or other disadvantages of the above-discussed prior systems.

There are also many occasions when absent subscribers would like to exercise control functions at their premises from a remote location. Such functions might include energizing a group of lights to illuminate a driveway or entrance hall in a residence, activating an air conditioning system, changing a thermostat setting on a heating system, or the like. An absent subscriber may also want to leave messages for other occupants who are at the premises or who are expected to return to the premises before him. In their simplest form, the messages may cause the operation of a relay at the subscriber's premises that illuminates certain written instructions such as "take food out of the freezer" or "call XYZ". In a slightly more complex form, the message may cause the illumination of a single or multidigit number which refers to prearranged instructions. In still other occasions, the absent subscriber may want to transmit longer messages and have them recorded at his premises. It would also be highly desirable if these control and message functions could be provided along with the remote supervisory functions previously discussed as part of a single improved system.

OBJECTS OF THE INVENTION

It is, accordingly, a primary object of the present invention to provide an improved remote supervisory system that utilizes existing telephone circuits and equipment to implement the supervision.

Another object of the invention is to provide a remote supervisory system of the type described that handles alarm reporting functions essentially as if they were normal telephone calls without the need for special interrogation signals and therefore without the need for special circuit accessing apparatus at the telephone company central office.

Another object of the invention is to provide a remote supervisory system of the type described that permits the use of relatively simple auxiliary equipment at the subscriber's premises which does not have to recognize dial tone, busy signals or call completion.

Another object of the invention is to provide a remote supervisory system of the type described that forwards alarm condition reports to the telephone company central office as they occur and in which the telephone company central office may initiate corrective action or in turn forward the alarm report to another entity which can receive and record the report and take corrective action.

Another object of the invention is to provide a remote supervisory system of the type described that performs periodic integrity checks on the subscriber's telephone circuit and reports circuit integrity failures as alarms.

Still another object of the invention is to provide a remote supervisory system of the type described that enables authorized subscriber's to transmit, from remote locations to their premises, commands and messages during those periods when the premises are being supervised.

Other objects will in part be obvious and will in part appear hereinafter.

SUMMARY OF THE INVENTION

A remote supervisory system embodied in accordance with the present invention is adapted for use in conjunction with a telephone company central office. Each subscriber that is to receive the supervisory service is provided with alarm-reporting auxiliary equipment which is installed at his premises. The auxiliary equipment creates an off-hook condition on the subscriber's telephone circuit when an alarm condition occurs. The linefinding equipment in the central office to which the subscriber's circuit is connected recognizes the off-hook condition and the identity of the subscriber as it normally does in the case of an outgoing call from the premises. The subscriber's identification is stored in the central office memory. The central office connects a signal receiver to the subscriber's circuit.

The auxiliary equipment at the premises, having been actuated by the alarm condition, transmits signals to the central office signal receiver which are indicative of the nature of the alarm at the premises. These alarm signals are stored along with the subscriber's identification in the central office memory. The alarm report is accordingly stored instantaneously at the central office. The off-hook condition of the subscriber's circuit need last only a few seconds for the alarm report to be completed, thereby avoiding a prolonged tie-up of the circuit.

Once the central office has stored the information about the alarm, it automatically forwards the information to the entity which can take action on it. As an example, the central office may be adapted to forward information about intrusion to the police department, information about smoke or abnormally high temperature to the fire department, and other information to any other entity such as, for instance, one of its own departments or a telephone answering service, that has been designated to receive the information and to initiate corrective action.

To forward the information about the alarm condition, the central office originates a telephone call to the proper destination and repeats the call until the destination is reached. The recipient of the call answers by returning a "start-sending" signal to the central office. When this signal is received, the central office transmits the identification of the subscriber and information as to the nature of the alarm.

In accordance with another feature of the invention, the system monitors the integrity of the subscriber's telephone circuit by having the subscriber's auxiliary equipment create an off-hook condition, not only when an alarm condition occurs, but also at predetermined, spaced time intervals regardless of the existence of an alarm condition. Each time the central office senses a periodic off-hook signal on the subscriber's circuit, it stores a "line intact" signal along with the subscriber's identification. If, however, an off-hook condition indication is not received within the predetermined time interval which has been set for a particular subscriber's auxiliary equipment, the central office stores a "line integrity failure" signal under the subscriber's identification and reports this failure as an alarm to the appropriate destination, for example, the police department or the telephone company repair department. Thus, an alarm indication is forwarded to the central office even if fire or some other abnormality should cause destruction of the auxiliary equipment at the subscriber's location or interrupt the subscriber's circuit to the central office.

In accordance with another feature of the invention, the system may provide, in addition to the alarm reporting supervisory functions hereinabove described, remote control functions which enable the subscriber to transmit, from remote locations to his premises, commands and messages during the periods when the premises are being supervised.

The absent subscriber, using a remote telephone set, dials a special number to the central office to access a command register there. Having completed the connection to the command register, the subscriber then dials the telephone number of his premises, a coded identification number which has been assigned to him and the desired command or message. These commands or messages may correspond to a single digit or may consist of a plurality of digits which are to be transmitted to the subscriber's location. If desired, the commands may be preceded by a special group of digits which identify their authenticity. Subsequent commands may activate the proper circuits in the subscriber's auxiliary equipment, or extend the off-hook condition of the subscriber's circuit until such time as the transmission of longer duration commands or messages is completed.

When the auxiliary equipment at the subscriber location creates an off-hook condition as part of the remote supervisory operation, the central office will, as discussed above, identify the subscriber, record this identification and assign a signal receiver to the subscriber. As soon as the subscriber's identity has been established, the central office searches the command register for commands and messages that pertain to the subscriber. After the alarm status report is completed, and after the subscriber's supervisory transmission has ended, the central office switches the connection to the subscriber from the alarm signal receiver to the command register. The command register then transmits to the subscriber's premises the commands and messages, if any, it has stored concerning the subscriber. The commands may operate command receivers in the auxiliary equipment at the subscriber's premises which initiate the control functions desired by the subscriber.

The command register in the central office preferably accepts commands for storage and transmission to the subscriber's premises only upon receiving the subscriber's coded identification number. It thus prevents unauthorized callers from dialing the subscriber's number while the premises are vacant, waiting until the subscriber's equipment goes off-hook as part of the supervisory operation and then transmitting unauthorized commands. As a further precaution in this regard, the auxiliary equipment at the subscriber's location may also be equipped with a ringing detector. If ringing is received at the subscriber's telephone set, as would be the case in the event of a normal incoming call, the ringing detector inhibits the auxiliary equipment from going off-hook as part of the supervisory operation for a period in excess of the duration of the normal ringing cycle. This prevents the unauthorized caller from making a connection to the subscriber's auxiliary equipment and transmitting unauthorized commands thereto.

In accordance with still another feature of the invention, the remote supervisory system may also be used to transmit subscriber provided messages of extended duration to the auxiliary equipment at the subscriber's premises. To avoid overloading the command register circuits in the central office with the extended messages, the system enables the messages to be transmitted to the premises through a channel which is established in the same manner as a normal subscriber-originated telephone call.

According to this feature, the absent subscriber, using a remote telephone set, dials a special number to access the central office command register. Having completed this connection, the subscriber dials the telephone number of his premises, his coded identification number, a command digit which indicates that a message of extended duration is to be transmitted and the telephone number of the remote subset from which he is calling. When the auxiliary equipment at the subscriber's premises makes its next report, the central office command register transmits a "prepare for message" signal to the auxiliary equipment preparing it for the extended message. The auxiliary equipment, in turn, switches its circuits so that it can respond to incoming calls during a predetermined, limited time interval by creating an off-hook condition upon receiving an incoming ringing signal. At the same time, the auxiliary equipment interrupts the circuit to its command receivers so that no commands can be received during the time interval. Additionally, it connects a simulated busy signal to the subscriber circuit during the time interval. Unauthorized callers who happen to call during the interval thus receive the busy signal and should normally hang up.

After the "prepare for message" signal is transmitted by the central office command register, the central office places a call to the telephone number previously entered by the subscriber and, upon completing the call, transmits a "ready" signal to the subscriber to indicate that his auxiliary equipment is ready to receive a call. The subscriber then dials his own premises. Upon reaching his premises, the subscriber dials his identification code and a "stay off-hook" command. If the call is received within the predetermined time interval set by the auxiliary equipment, the auxiliary equipment verifies that the identification code is correct and thereafter maintains an off-hook condition on the subscriber circuit. The auxiliary equipment then connects the circuit to a recording unit which receives and records the subscriber's extended message. The auxiliary equipment remains in the message receiving mode until the message transmission is completed and a "release" command is transmitted by the subscriber, or until an alarm condition at the premises occurs or until the time comes for the next periodic supervisory report. If the subscriber is interrupted by a report, he may simply reinitiate the extended message sequence to complete his message. If the subscriber completes the message and transmits the "release" command, all circuits are restored to their normal condition after he goes on-hook on the remote telephone subset from which he called.

Depending on the type of recording unit that is used at the subscriber's premises, the extended message transmitted by the subscriber may be in the form of voice, teleprinter or any other digital or tone signal combinations within the voice frequency band. The storage of the received messages in the recording unit at his premises may be on tape, in digital registers or the like. The message may be stored for later playback or print out, or printed out immediately as in the case of a teleprinter message. In transmitting the message, the subscriber may use message transmitting apparatus which is acoustically coupled to the microphone in the handset of the telephone subset from which he calls.

BRIEF DESCRIPTION OF THE DRAWING

The foregoing and other objects, features and advantages of the invention will be better understood from the following detailed description taken in conjunction with the accompanying drawing in which.

DETAILED DESCRIPTION OF ILLUSTRATIVE EMBODIMENT

Figure 1:
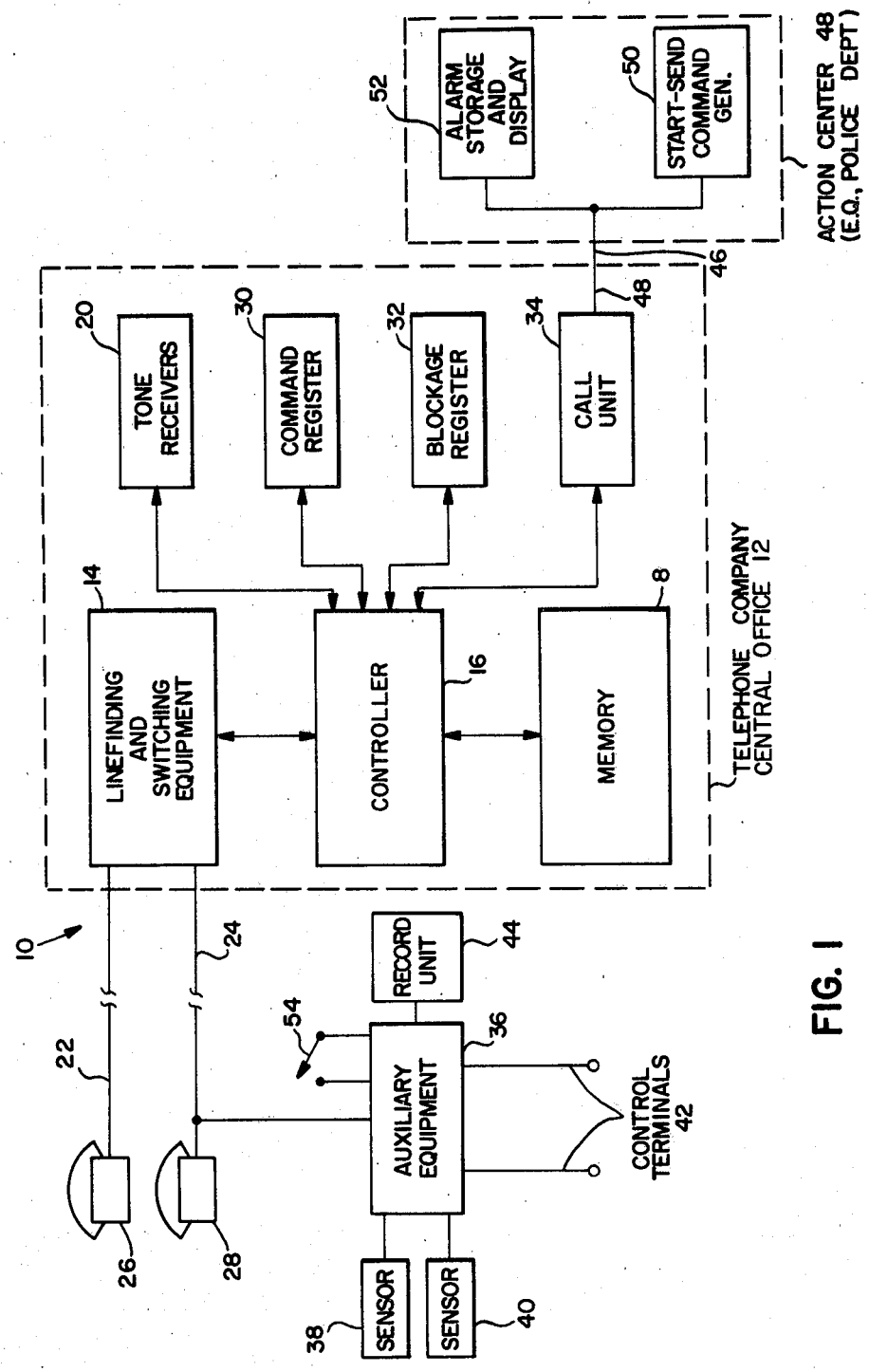
FIG. 1 is a generalized block diagrammatic illustration of a remote supervisory system embodied in accordance with the invention.

Referring now specifically to the drawing, and initially to FIG. 1 thereof, there is shown, in generalized block diagrammatic form, a remote supervisory system 10 embodied in accordance with the invention. As noted previously, the system 10 is adapted for use in conjunction with a telephone company central office 12. The central office 12 includes linefinding and call switching equipment 14 which is operated and controlled by a controller 16 which may comprise a full scale, program controlled computer. Storage for crucial data, such as the control program for controller 16 and subscriber identification, line assignment and class of service information, is provided in a memory 18. Tone receivers 20 are connectible by the controller 16 to individual incoming subscriber circuits 22 and 24 and their corresponding subscriber subsets 26 and 28, respectively. The tone receivers 20 serve to convert multifrequency tone dial signals on the circuits 22 and 24 to logic signals recognizable by the controller 16.

The central office 12 is also equipped with a command register 30, an incoming call blockage register 32 and a call report unit 34, the purpose of which will be explained in detail hereinbelow. While the registers 30 and 32 are shown in FIG. 1 as separate blocks, they may actually comprise preassigned and reserved memory locations in the memory 18. Similarly, the call report unit 34 may be part of the controller 16 itself.

The subscriber circuit 22 is a normal telephone circuit not adapted to participate in the remote supervisory service. The subscriber circuit 24, on the other hand, is adapted to participate in the remote supervisory service and has auxiliary equipment 36 coupled thereto and located at the subscriber premises. A plurality of sensors 38 and 40 are distributed about the subscriber's premises and coupled to the auxiliary equipment 36. The sensors 38 and 40 sense alarm conditions at the premises. By way of example, one of the sensors 38 may be a temperature sensor which transmits a signal to the auxiliary equipment 36 when the temperature sensed thereby exceeds a certain predetermined maximum temperature. The other sensor 40 may comprise an intrusion switch which is connected to a door or window at the premises and which transmits a signal to the auxiliary equipment 36 when the door or window is opened. The sensors 38 and 40 may be similarly adapted to sense any of a wide variety of other conditions at the premises. Additionally, while only two sensors are shown in FIG. 1, it will be clear from the description below that any number of sensors may be coupled to the auxiliary equipment 36.

The auxiliary equipment 36 also has extending therefrom control terminals 42. As explained more fully below, the auxiliary equipment 36 responds to commands from absent subscribers received over the subscriber circuit 24 to switch, or change the electrical condition of, the control terminals 42. The control terminals 42 may thus be connected to switchably control any of a variety of devices at the premises. For example, the terminals 42 may be wired to control selected ones of a group of lights which are associated with particular prearranged messages, lights which illuminate a part of the premises, a solenoid which, when energized, changes a thermostat setting, or any other such device. Again, although only two control terminals 42 are shown in FIG. 1, any number of control terminals may extend from the auxiliary equipment 36.

A recording unit 44 is also coupled to the auxiliary equipment 36 for use in recording subscriber supplied messages of extended duration received over the circuit 24.

The general operation of the system 10 is as follows. If one of the sensors 38 or 40 senses an alarm condition at the premises, the auxiliary equipment 36 responds thereto by creating an off-hook condition on the subscriber circuit 24. and by transmitting signals which indicate the nature of the alarm. The central office line-finding and switching equipment 14 observes the off-hook condition and identifies the subscriber as it normally does when the subscriber goes off-hook to place an outgoing call from the subset 28. The subscriber's identification is stored in the common memory 18, again as in the case of a normal call. The common controller 16 then connects one of the tone receivers 20 to the subscriber circuit 24. Again, this is a normal operation if the subset 28 is a tone dial subset.

The auxiliary equipment 36 at the premises transmits over the circuit 24 one or more tone signals or tone signal combinations which are indicative of the nature of the alarm condition at the premises. These tone signals are detected by the tone receivers 20 in the office 12, converted to corresponding logic signals, and stored in the memory 18 along with the subscriber's identification. When sufficient time has elapsed to perform the alarm reporting function, the auxiliary equipment 36 automatically returns the circuit 24 to an on-hook condition.

Having received and stored the alarm report, the controller 16 activates the call report unit 34 to originate a call to the destination previously designed to receive the alarm report. In FIG. 1, the unit 34 is shown forwarding the call report over a circuit 46 to an action center 48, which may be the local police department for intrusion alarms, the fire department for high temperature alarms, or any other center. The circuit 46 may be a direct or dedicated circuit to the action center 48, in which case the circuit is never "busy". Alternatively, the unit 34 may place the call report to the action center 48 through the normal telephone network. In the latter case, the controller 16 should be adapted to retry the call report if a busy signal is sensed from the action center 48.

The action center 48 includes a "start-sending" command signal generator 50 which transmits a "start-sending" signal to the call unit 34 at the central office 12 when a successful connection thereto has been made. In response to the receipt of that signal, the controller 16 transmits over the connecting circuit 46 the information that is stored in the memory 18 concerning the subscriber's identification and the nature of the alarm at his premises. The information may be received and displayed in an alarm storage and displaying unit 52 of any suitable construction which is available for immediate inspection by the appropriate personnel at the center 48.

The auxiliary equipment 36 is equipped with a switch 54 for enabling and disabling the equipment 36. The subscriber may thus enable the alarm reporting function when he leaves his premises and disable the function when he returns.

The blockage register 32 in the central office 12 is used to store incoming call blockage commands supplied by the subscriber prior to enabling his auxiliary equipment 36. The register 32 is accessible by dialing a predetermined telephone number. Once a connection to the register 32 is made, the subscriber may dial an identification code, which is verified for accuracy by the controller 16, and a blockage code which is stored in the register 32 and which informs the controller 16 to block all incoming calls to the subscriber's subset 28. When an incoming call is received, the controller 16 checks the blockage register 32 to determine if a blockage command is in effect for the called subscriber and, if it finds such a command, prevents access to the subscriber's line 24. This prevents unauthorized callers from reaching and interfering with the operation of the auxiliary equipment 36.

The blockage code may be removed by the subscriber when he returns to his premises by again dialing the telephone number of the blockage register 32, his identification number and a suitable blockage removal code.

In addition to providing alarm reports when alarm conditions occur at the premises, the auxiliary equipment 36 may also provide periodic circuit integrity reports to the central office 12. More specifically, the equipment 36 creates an off-hook condition on the subscriber circuit 24 not only when an alarm condition occurs, but also periodically, for example, once every 5 minutes. When the controller 16 in the office 12 senses the periodic off-hook condition on the subscriber circuit 24, it stores a "line-intact" signal in the memory 18 along with the subscriber's identification. If an off-hook condition is not again sensed for the circuit 24 within the time period which has been set for the auxiliary equipment 36, the controller 16 stores a "line integrity failure" signal in the memory 18 with the subscriber identification. The "line integrity failure" is then reported through the call report unit 34 to the action center 48 in exactly the same manner as the alarm reports previously discussed.

The subscriber may also utilize the system 10 to initiate control functions at his premises from a remote location. To accomplish this, the subscriber dials, from a remote subset, such as the subset 26 of FIG. 1, a telephone number which has been assigned to the command register 30 in the office 12. When the connection to the register 30 is established, the subscriber dials his identification code, which is verified by the controller 16, and a preset command code which is indicative of the operation to be performed at his premises. The command code is stored in the command register 30 along with the subscriber's identification.

After the auxiliary equipment 36 at the subscriber's premises goes off-hook as part of its periodic report and completes its report to the office 12, the controller 16 searches the command register 30 for commands pertaining to the subscriber. If a command is found, the controller 16 transmits the command over the subscriber's circuit 24 to the auxiliary equipment 36. The equipment 36 responds to the command by switching the appropriate one of its control terminals 42 to initiate the desired operation at the subscriber's premises.

The procedure for transmitting messages of extended duration through the system 10 is somewhat different. It would be undesirable to overload the common register 30 at the office 12 with messages of extended duration. The system 10, therefore, handles the extended messages transmissions as normal inter-subscriber telephone calls.

The extended messages may be transmitted to the subscriber's premises from any remote telephone subset, such as the subset 26 in FIG. 1. The subscriber dials the telephone number of the central office command register 30 and, upon establishing the connection, he dials his identification code, which is verified by the controller 16. The subscriber then dials the telephone number of his premises, the telephone number of the subset 26 from which he is calling and a "prepare for message" code, which are stored in the command register 30. After the auxiliary equipment 36 at the subscriber's premises makes its next periodic report, the controller 16 searches the command register 30 and finds the "prepare for message" code. The code is transmitted by the controller 16 over the circuit 24 to the auxiliary equipment 36 which initiates a predetermined, limited time interval during which it enables the completion of incoming calls.

The controller 16 next dials the subscriber at the telephone number from which he called and transmits a "ready" signal to him to indicate that his auxiliary equipment 36 has been prepared for the extended message. Further more, the controller 16 disables the blockage register 32 for a limited period of time. The subscriber then dials his own telephone number and, provided he accesses his equipment 36 within the predetermined time interval set by the equipment 36, the call goes through. The subscriber then dials a "stay-off-hook" command to which the equipment 36 responds by establishing a prolonged off-hook condition on the circuit 24 and by connecting the recording unit 44 to the circuit 24. The subscriber may then transmit his extended message to his premises where it is received by the unit 44. The subscriber may dial further commands to control the operation of the unit 44, for example, to rewind the unit 44 or playback his message. The subscriber's message may be in the form of voice, teleprinter or any other digital or tone signal combinations within the voice frequency band. The subscriber may also use message transmitting apparatus, such as a telecopier, which is acoustically coupled to the mircrophone of the handset of the telephone subset from which he calls. The recording unit 44 is of the appropriate type for recording the message, printing it out immediately or playing it back or printing it out at a later time upon receipt of a suitable command.

After the message is completed, the subscriber dials a "release" command to which the equipment 36 responds by disconnecting the recording unit 44 from the circuit 24 and returning to its incoming call preventing mode. When the subscriber goes back on-hook, all circuits in the equipment 36 and in the office 12 otherwise return to their normal condition.

The modifications to the central office 12 necessary to implement the above functions are minimal in the case of common control offices. In fact, where the office 12 is a computer controller system of the type shown in FIG. 1, the modifications would involve only a few, rather straight-forward programming changes to the controller 16 control program which are well within the ability of those normally skilled in the art. The make-up of the auxiliary equipment 36, on the other hand, is not totally obvious from the foregoing general description and a detail description of an illustrative embodiment of the equipment 36 will now be provided, with specific reference being made to FIG. 2 of the drawing.

Figure 2:
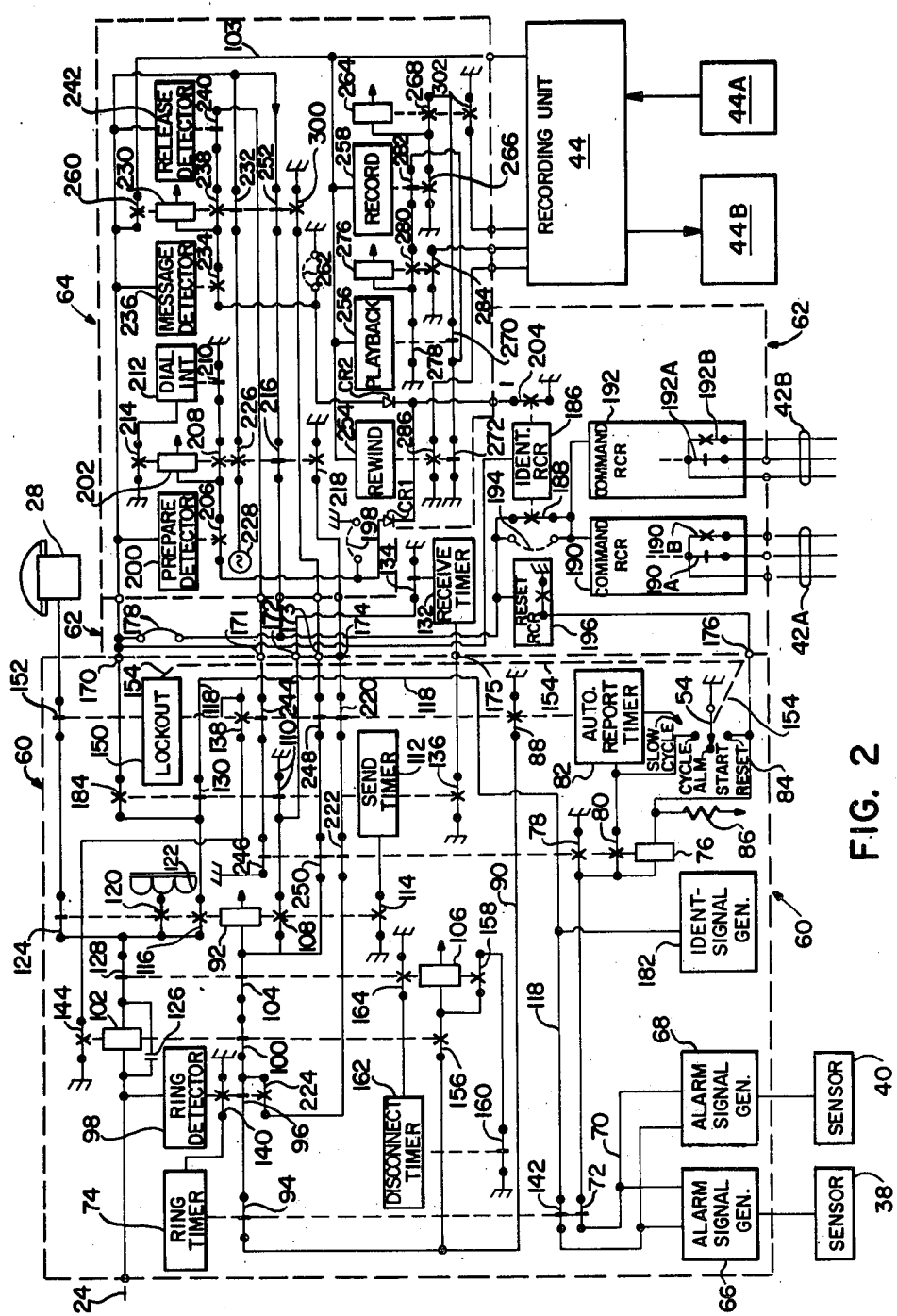
FIG. 2 illustrates further details of auxiliary equipment to be installed at the subscriber's premises in the remote supervisory system of FIG. 1.

In FIG. 2, the familiar "detached contact" circuit notation is utilized wherein an "X" shown intersecting a circuit represents a normally open, or "make", contact of a relay, a bar shown intersecting a circuit at a right angle represents a normally closed, or "break", contact of a relay, and where "normally" refers to the unenergized or released condition of the relay.

In FIG. 2, there is shown the subscriber's subset 28 and the subscriber circuit 24 which extends to the central office 12 of FIG. 1. The auxiliary equipment 36 is divided into three sections: an alarm reporting section 60 shown on the left side of FIG. 2; a command receiver section 62 shown in the center of FIG. 2; and, an extended message receiver section 64 shown on the right side of FIG. 2. If only the alarm reporting function is desired, then only section 60 need be provided in the equipment 36. The sections 62 and 64 may be added as options to the equipment 36.

Sensors 38 and 40 of FIG. 1 are shown in FIG. 2 coupled to the alarm reporting section 60. Control terminals 42 of FIG. 1 are shown as terminals 42A and 42B, respectively, in FIG. 2 extending from the command receiver section 62. Recording unit 44 of FIG. 1 is shown in FIG. 2 coupled to the extended message receiver section 64.

The sensors 38 and 40 are coupled to alarm signal generators 66 and 68 in the section 60. As soon as an alarm condition is detected by one of the sensors 38 or 40, the corresponding generators 66 or 68 connect ground to lead 70. Through break contact 72 of a ringing interval timer 74, the ground on lead 70 operates an alarm relay 76. When switch 54 is in the "alarm start" position shown in FIG. 2, the alarm relay 76, when energized, closes a holding circuit at its make contact 78 and, through its make contact 80, energizes an automatic reporting timer 82. The alarm relay 76 remains energized until ground is applied to lead 84 and thus to the junction of supply resistor 86 and relay 76. Ground can be applied by turning switch 54 to its "reset" position or by a reset receiver 196 in the command receiver section 62 of FIG. 2. The circumstances under which ground is applied by the reset receiver 196 are explained in a later part of the description.

When switch 54 is moved to its "cycle" position, it applies ground to a first input of timer 82. This causes the timer 82 to operate periodically and continously (e.g., every 5 minutes), even if the alarm relay 76 has not operated. If the switch 54 is moved to its "alarm-start" position, operation of the alarm relay 76, which locks itself until reset, will similarly apply ground to the first input of timer 82 and cause it to operate periodically and continuously. If switch 54 is moved to its "slow-cycle" position, thereby applying ground to a second input of timer 82, the cycling interval may be increased greatly and become, for instance, 30 minutes or an hour. If an alarm is detected while switch 54 is in the "slow-cycle" position, the application of ground to the second input of timer 82 re-establishes the more rapid cycling of the timer 82.

If there is neither an off-hook condition nor an incoming call in progress on the circuit 24, the operation of timer 82, by the closing of make contact 88, applies ground to an "alarm start" lead 90. This ground energizes hookswitch relay 92 through break contact 94 of the ringing interval unit 74, break contact 96 of a ring detector 98, break contact 100 of a line current relay 102 and break contact 104 of a disconnect relay 106.

The hookswitch relay 92, when operated, closes a holding circuit over its make contact 108 and break contact 110 of a send interval timer 112. This circuit keeps the hookswitch relay 92 operated at least until such time as the send interval timer 112 has completed its timing cycle and beyond that time if the circuits of the command receiver section 62 of FIG. 2 have been installed. Another make contact 114 of hookswitch relay 92 applies ground to the send interval timer 112 thereby causing the timer 112 to start its timing interval.

The hookswitch relay 92 also closes its make contact 116 thereby connecting the subscriber circuit 24 to "send" lead 118. Furthermore, the hookswitch relay 92 closes its make contact 120 so as to connect a holding impedance 122 to the circuit 24 and thereby create an off-hook condition on the circuit 24. The opening of break contact 124 interrupts the circuit to the subset 28. The off-hook condition on the circuit 24 is sensed at the central office 12 (FIG. 1), as previously discussed. At this time, the circuit 24 is connected through the line current relay 102, which is bypassed by condensor 126 to reduce its AC impedance, through break contact 128 of the disconnect relay 106, through make contact 116 of the hookswitch relay 92 and break contact 130 of the send interval timer 112 to the send line 118.

The send line 118 connects to an identification signal generator 182 and to the alarm signal generators 66 and 68. The identification signal generator 182 is adapted to transmit a coded tone signal over the send line 118 to the central office 12 even if no alarm conditions exist at the premises. That tone signal is recognizable by the office 12 as a "line intact" indication. The alarm signal generators 66 and 68 send coded tone signals through break contact 142 of ring timer 74 to the central office 12 if any alarm conditions do, in fact, exist at the premises.

At the end of the timing period of the send interval timer 112, break contact 110 opens. Unless section 62 has been installed, relay 92 will release thereby removing the holding impedance 122 at its make contact 120. If the command receiver section 62 has been installed, its receive interval timer 132 will continue to apply a holding ground for hookswitch relay 92 over its break contact 134. When the send interval has terminated, the send interval timer 112 removes one holding ground for the hookswitch relay 92 at its break contact 110 and it initiates a "command receive" time interval by applying ground through its make contact 136 to the receive interval timer 132.

Heretofore, it was explained that the subscriber, before leaving his premises, may "dial-in" his identification number and a command to blockage register 32 in the central office 12 to prevent any incoming calls from being completed to his line 24. If this is done, there is obviously no chance that an incoming call may be completed to the subscriber number.

If the chances that erroneous commands might be transmitted are small and if the adverse effects of receiving an erroneous command are limited, the blockage register 32 may be omitted from the central office 12 and a less rigorous incoming call preventing arrangement may be incorporated in the equipment 36 itself. Such an arrangement is shown in FIG. 2.

More specifically, the ring detector 98 is adapted to sense incoming ringing on the circuit 24 and, in response thereto, to open its break contact 96 thereby interrupting the path over which the hookswitch relay 92 can be energized. As soon as the ring detector 98 operates, it energizes the ringing interval timer 74 over its make contact 140, causing the timer 74, at its break contact 94, to break the circuit over which the hookswitch relay 92 can be energized. The ringing interval timer 74 will keep operated for a time interval which is longer than the time between successive ringing signals and its timing interval is restarted each time the ring detector 98 senses a ringing signal and closes its make contact 140. As a result, the hookswitch relay 92 cannot be energized until incoming ringing has stopped. In addition to this, the ringing interval timer 74, by opening its break contact 72, delays the initiation of an alarm report until the incoming ringing has ceased and, by opening its break contact 142, prevents the application of alarm signals to the send line 118.

Certain conditions at the premises, such as a blast or vandalism, may cause the handset of the subset 28 to be knocked off-hook before the automatic reporting timer 82 has applied ground to the alarm control lead 90. In that event, line current is flowing in the circuit 24 and line current relay 102 is operated. The opening of break contact 100 breaks the circuit to the hookswitch relay 92 preventing the relay 92 from operating and preventing the alarm reports from being forwarded to the central office 12. The equipment 36 is designed to accommodate this contingency.

When the automatic reporting timer 82 operates, it closes a circuit from ground, through make contact 144 of the line current relay 102 and its own make contact 146, thereby energizing a subscriber subset lockout unit 150. The unit 150 locks in the operated condition, thereby interrupting the circuit to the subset 28 at its break contact 152 and removing the off-hook condition. The unit 150 is adapted to be reset automatically by a linkage 154 when switch 54 is moved to its reset position. A suitable electrical interlock may be substituted for the linkage 154.

The subsequent operation of the hookswitch relay 92 upon an alarm report might be sensed by the central office 12 as a short interruption in the off-hook condition caused by the displaced handset. As it is desirable to handle each alarm report as a new originating call, it is desirable to cause an on-hook condition which is long enough to be well in excess of dial pulses and hookswitch flashes so that it will release all central office equipment before the alarm report creates a new off-hook condition. For this reason, the disconnect relay 106 is arranged to operate over make contact 156 of the line current relay 102 as soon as the automatic reporting timer 82 closes its make contact 88. The disconnect relay 106 closes a holding circuit over its own make contact 158 and break contact 160 of a disconnect interval timer 162 to ground. Break contact 128 of the disconnect relay 106 interrupts the circuit 24 to the central office 12, thereby creating an on-hook condition. One make contact 164 of the disconnect relay 106 energizes the disconnect interval timer 162 which operates after a delay of a few seconds. During this delay period, the line current relay 102 has released thereby closing its break contact 100. When the disconnect timer 162 opens its break contact 160, the disconnect relay 106 releases, thereby closing its break contact 104. This permits the hookswitch relay 92 to operate after an on-hook condition period of a few seconds. Thereafter, the operation of the equipment 36 is as described previously.

If the command receiver section 62 is installed, it is connected by interconnecting terminals 170 through 176 in FIG. 2. If no extended message receiver section 64 is to be installed, option strap 178 is installed.

At the end of its timing cycle, the send interval timer 112 opens its break contact 110 thereby interrupting one of the circuits over which the hookswitch relay 92 is kept energized. However, the break contact 134 of the receive interval timer 132 provides a continued holding ground for the hookswitch relay 92. At the end of the timing interval of the send interval timer 112, the timer 112 opens its make contact 130, thereby disconnecting the circuit 24 from the send line 118 and extends the circuit 24 through its make contact 184 to the command receiver section 62 and the extended message receiver section 64 (if installed). At the end of the timing interval of the send interval timer 112, the timer 112 energizes the receive interval timer 132 through its make contact 136. For the duration of the receive timer interval, the central office 12 can now transmit command signals to be received by the equipment 36. The central office 12 is alerted to the start of this command signal receive interval by the disappearance of the identification signal generated by the identification signal generator 182.

As in the case of the alarm reporting signals transmitted by the equipment 36, the command signals transmitted by the central office 12 to the equipment 36 may be single-frequency or multifrequency tone signals and may be modulated by digital or other coding or modulation. To protect the equipment 36 from unauthorized commands, the central office 12 may be adapted to transmit a customer identification signal in advance of the command signals. The identification signal operates an identification signal receiver 186 and causes the receiver 186 to hold its make contact 188 closed for a time which is sufficient for the command signals to be received. With make contact 188 closed, one or both of command receivers 190 and 192 can receive a command signal which causes the operation of their corresponding make and break contacts 190A-190B and 192A-192B, respectively. External devices may be wired to the control terminals 42A and 42B and switched on or off by the operation of the command receivers 190 and 192. Subsequent command signals cause the command receivers 190 and 192 to release and thereby to reverse the switching effect on the control terminals 42A and 42B.

An option strap 194 may be installed to by-pass make contact 188 of the identificaion signal receiver 186 in the event that the identification check is not to be made by the equipment 36 prior to the receipt of commands.

Alarm reporting could be initiated by conditions, such as a temporary loss of electric power, which are known to have been cleared. In such a case, it would be desirable to stop the periodic reporting of the automatic reporting timer 82. The central office 12 may be adapted to transmit a "reset" signal to the equipment 36 for this purpose. The reset signal is received by the reset receiver 196 in section 62 which applies ground to the reset lead 84 and releases the alarm relay 76. The reset command from the office 12, unlike the other command signals, need not go through to the identification signal receiver 186 because, if the alarm condition persists, it will reactivate the alarm relay 76 immediately anyway. Thus, unauthorized signals can not shut off the alarm function.

The extended message receiver section 64 will now be described in detail. As noted previously, the section 64 may be included in the equipment 36 as an option with or without the command receiver section 62. If, however, section 62 is installed, the identificaion function performed thereby may also be used as an additional precaution in the extended message sequence. In other words, the central office 12 may be adapted to transmit an identification signal to operate the identification signal receiver 186 prior to permitting the transmission of an extended message. This precaution in the equipment 36 would be in addition to the precaution built into the central office 12 operation that requires the subscriber to dial an identification code prior to accessing his equipment 36. If such a double level of protection against interference by unauthorized persons is desired, the option strap 194 in the command receiver section 62 and option strap 198 in the extended message receiver section 64 are omitted. If the extra identification check in the equipment 36 is not desired for both the command function and the extended message function, straps 194 and 198 are installed.

As noted above, the subscriber initiates the extended message sequence by dialing certain information to the central office 12. To prepare the equipment 36 for the extended message, the central office 12 transmits an identification signal, if such additional identification is in effect for the equipment 36, and subsequently transmits a "prepare for message" command which operates a "prepare-for-message" detector 200. If the identification signal receiver 186 is incorporated, it is operated by the identification signal and keeps itself operated for a short interval. During this interval, operation of the "prepare-for-message" detector 200 operates a relay 202, through make contact 204 of the identification receiver 186, via diode CR1 and make contact 206 of the detector 200. If no identification verification is required, relay 200 operates through option strap 198 and the make contact 206 of the detector 200.

The relay 202, when operated, closes a holding circuit over its make contact 208, and break contact 210 of a dial interval unit 212 to ground. Another make contact 214 of relay 202 energizes the dial interval unit 212. The timing interval of the unit 212 is set to provide enough time for the central office 12 to dial the subscriber at the telephone number from which he initiated the extended message request and for the subscriber to dial the number of his own subset 28. The time interval may, for example, be two minutes.

As long as the relay 202 remains energized, the connection to the circuit 24 extending to the central office 12 and the connection to the command receivers 190 and 192 is interrupted by the opening of break contact 216. Make contact 218 of the relay 202 also prepares a circuit via break contact 220 of the automatic reporting timer 82 and break contact 222 of alarm relay 76 over which the hookswitch relay 92 can be energized. Hookswitch relay 92 can now be energized if incoming ringing is received on the circuit 24 by the closing of make contact 224 by ring detector 98. Another make contact 226 of the relay 202 prepares a circuit over which simulated busy signals, generated in busy signal generators 228, are applied to the circuit 24 until such time as relay 230 has operated to open its break contact 232.

In order to successfully access the equipment 36, the subscriber must dial his subset 28 within the timing interval of the dial interval unit 212. If that is done, the hookswitch relay 92 operates when the ring detectors 98 senses the incoming ringing and closes its make contact 224. The subscriber then hears the tone generated by the identification signal generator 182 (as well as such alarm tones as might be generated by the alarm signal generators 66 and 68) followed by the simulated busy signal generated by generator 228. On hearing the busy signal, a person oher than the subscriber who has dialed the subscriber's subset 28 should hang-up thinking that the number he has reached is busy.

If option strap 194 is omitted, the subscriber must now again transmit an identification code, thereby activating the identification receiver 186. Receiver 186 keeps itself energized for a short time and prepares a circuit from ground through its make contact 204, diode CR2, and make contact 234 of an extended message detector 236. The absent subscriber should thereupon transmit a "stay-off-hook condition" code which operates the extended message detector 236. The detector 236, when operated, energizes the relay 230. The relay 230 closes a hold circuit over its make contact 238, break contact 240 of a release command detector 242, break contact 244 of the automatic reporting timer 82 and break contact 246 of the alarm relay 76. Thus, the relay 230 releases when a "release" command is transmitted, which operates the release command detector 242. The relay 230 also releases when a routine status report is initiated by the timer 82 and when an alarm condition is detected. In the latter two cases, operation of the disconnect relay 106 causes an on-hook condition of a few seconds duration on the circuit 24, as described earlier. The relay 230, when operated through its make contact 300, also closes a direct holding circuit for the hookswitch relay 92 over break contact 248 of the automatic reporting timer 82 and break contact 250 of the alarm relay 76. The relay 230 also opens the circuit from the circuit 24 to the command receivers 66 and 68 at its break contact 252 and it connects the circuit 24 to the recording unit 44 and to its associated control units 254, 256 and 258 through its make contact 260. In the case where the extra identification of the identification receiver 186 has been omitted, permanent ground is applied to the make contact 234 of the extended message detector 236 by installing option strap 262.

By transmitting a "record" command, the subscriber can now operate the record control unit 258 thereby energizing record relay 264 over make contact 266. The record relay 264 closes a holding circuit over its own make contact 268 and break contact 270 of the playback control unit 256 and break contact 272 of the rewind control circuit 254. Operation of either of the units 256 and 254 by the receipt of "playback" or "rewind" command releases the record relay 264. When energized, relay 264 energizes the "recording" mode of operation of recording unit 44 through its make contact 302 enabling the subscriber to record his extended message.

In similar manner, the playback control unit 256 can be operated to energize the playback relay 276 over its make contact 278. The relay 276 closes a holding circuit over its make contact 280 and break contact 282 of the record control unit 258 and break contact 272 of the rewind control unit 254. This energizes the "playback" mode of operation of the unit 44 via make contact 284. Finally, the rewind control unit 254 can be operated by a "rewind" command thereby energizing the "rewind" mode of operation of the unit 44 via its make contact 286.

When transmission of the extended message is completed, the subscriber sends the "release" command which operates the release command detector 242 to release relay 230 and return the equipment 36 to its normal operating mode.

As indicated in FIG. 2, the recording unit 44 may be equipped with a read-in device 44A and read-out device 44B. The read-out device 44B may be a printer or any other suitable device for presenting messages in recognizable form. The read-in device 44A enables meassages to be recorded in the unit 44 at the subscriber's location. These messages can then be received by the subscriber during an extended message call to the equipment 36 by operating the playback control unit 256 during the call.

It should be understood that the foregoing detailed description of the remote supervisory system 10 and auxiliary equipment 36 is illustrative only and that numerous modifications thereto will be recognized by those skilled in the art without departing from the scope of the invention, as defined by the appended claims.

What I claim as new and desire to secure by Letters Patent of the United States is:

1. Apparatus for monitoring the condition of a telephone subscriber's premises comprising:
 (A) a telephone circuit extending from the premises;
 (B) a telephone switching office remotely located from the premises and connected to the telephone circuit, said office including:
  (i) linefinding and call switching means for recognizing an off-hook condition on the telephone circuit and
  ii. for switching telephone calls to and from the telephone circuit,
  (ii) means for controlling the operation of said linefinding and call switching means for identifying the subscriber whose telephone circuit is off-hook, and
  (iii) memory means accessible by said controlling means for storing information including information concerning the identity of the subscriber;
 (C) sensing means at the premises for detecting the occurrence of a predetermined condition at the premises;
 (D) auxiliary means at the premises connected to the telephone circuit, said auxiliary means including
  (i) means responsive to the detection of said predetermined condition by said sensing means for creating a temporary off-hook condition on the telephone circuit, the off-hook condition being recognized and the subscriber being identified by said linefinding and call switching means in said office,
  (ii) means for transmitting a reporting signal to said office over the telephone circuit during the off-hook condition which signal is indicative of the nature of said predetermined condition at the premises, said reporting signal being such that, although it is applied to the call switching means in the office in the same manner as switching signals, the linefinding and call switching means does not respond to said reporting signal, and (E) (i) a receiver at said office that detects said reporting signal,
(ii) said controlling means connecting said receiver to said circuit in response to said off-hook condition and responding to the detection of said reporting signal by said receiver by causing said reporting signal to be stored along with the subscriber identity in said memory means in said office.

2. The apparatus of claim 1 in which said sensing means comprises a plurality of sensors distributed about the premises and connected to said auxiliary means for sensing the occurrence of a plurality of predetermined conditions at the premises, said off-hook condition creating means in said auxiliary means being responsive to any one of sensors sensing said predetermined condition.

3. The apparatus of claim 1 in which said transmitting means in said auxiliary means comprises at least one tone signal generator for generating and transmitting said reporting signal as a coded tone signal indicative of the nature of said predetermined condition at the premises.

4. The apparatus of claim 1 in which said off-hook condition creating means in said auxiliary means includes means responsive to the detection of said predetermined condition for periodically creating a temporary off-hook condition on the telephone circuit and in which said transmitting means in said auxiliary means includes means for repeating the transmission of the reporting signal to said office during each such temporary off-hook condition.

5. The apparatus of claim 4 in which said office includes means for transmitting a reset signal over the telephone circuit to said auxiliary means and in which said auxiliary means includes reset means responsive to the receipt of the reset signal from said office for resetting said periodic off-hook creating means and said reporting signal transmitting means, whereby said periodic off-hook creating means and said reporting signal transmitting means operate again only if said predetermined condition is thereafter detected by said sensing means.

6. The apparatus of claim 1 in which said switching office includes means for forwarding said reporting signal and subscriber identity to an action center designated to receive the information, said forwarding means comprising means for placing a telephone call in said action center and for transmitting said reporting signal and subscriber identity during the course of that call.

7. The apparatus of claim 1 in which said auxiliary means further includes
(i) means for detecting ringing on the telephone circuit, and
(ii) means for preventing operation of said off-hook condition creating means if ringing is detected by said ringing detecting means, whereby an off-hook condition is not created by said auxiliary means during an incoming call.

8. The apparatus of claim 1 in which said office further includes
(i) incoming call blockage means accessible by the subscriber by dialing a predetermined telephone number for preventing said controlling means from switching incoming calls to the subscriber's circuit.

9. The apparatus of claim 1 in which there is a telephone subset at the premises connected to the telephone circuit and in which said auxiliary equipment further includes
(i) lock out means responsive to a prolongated off-hook condition on the telephone circuit and to the detection of said predetermined condition by said sensing means for disconnecting the telephone subset from the telephone circuit and for creating a temporary on-hook condition on the circuit prior to the operation of said off-hook condition creating means.

10. The apparatus of claim 1 in which said auxiliary means further includes
(i) means for creating an off-hook condition on the telephone circuit at predetermined spaced periods of time irrespective of the occurrence of said predetermined condition at the premises, and in which said office controlling means is adapted to sense the periodic off-hook conditions on the telephone circuit and is responsive to the absense of one of said periodic off-hook conditions on the telephone circuit to store circuit integrity failure signals and the subscriber's identity in said memory means, whereby the integrity of the telephone circuit is automatically monitored.

11. The apparatus of claim 10 in which said auxiliary means further includes
(i) means for transmitting an identification signal to said office over the telephone circuit during the periodic off-hook conditions the presence of which signal is indicative of the integrity of the circuit.

12. The apparatus of claim 10 in which said transmitting means in said auxiliary means transmits said reporting signal during the periodic off-hook condition if said sensing means has detected said predetermined condition at the premises at that time.

13. The apparatus of claim 10 in which said office further includes
(i) command signal storage means accessible by the subscriber by dialing a predetermined telephone number for storing subscriber provided command signals, in which said controlling means in said office is responsive to each of the periodic off-hook conditions on the telephone circuit for searching said command signal storage means for command signals supplied by the subscriber and for transmitting any of the command signals so found over the telephone circuit, and in which said auxiliary means further includes
(a) command signal receiver means responsive to the receipt of the command signals from said office for initiating control functions at the premises.

14. The apparatus of claim 1 in which said office further includes
(i) command signal storage means accessible by the subscriber by dialing a predetermined telephone number for storing subscriber provided command signals, in which said controlling means is responsive to an off-hook condition on the telephone circuit for searching said command signal storage means for command signals supplied by the subscriber and for transmitting any of said command signals so found to the telephone circuit, and in which said auxiliary means further includes (ii) command signal receiver means responsive to the receipt of the command signals from said office for initiating control functions at the premises.

15. The apparatus of claim 14 in which the subscriber is provided with an identification code which is stored in said memory means and in which said command signal storage means includes means for receiving the subscriber's identification code and for storing subscriber supplied command signals only if the received code corresponds to the code stored in said memory means.

16. The apparatus of claim 14 in which said command signal receiver means comprises a plurality of switchable receivers each including switchable output terminals, each of said receivers being responsive to a different one of the command signals for switching the electrical condition of its output terminals, whereby devices at the premises connected to said output terminals may be turned on or off by the command signals.

17. The apparatus of claim 14 in which said office further includes means for generating and transmitting a subscriber identification signal over the telephone circuit prior to the transmission of any of said command signals, and in which said auxiliary means further includes a subscriber identification signal receiver means for enabling said command signal receiver means responsive to the receipt of the subscriber identification signal.

18. The apparatus of claim 1 further including
(A) a recording unit at the premises for recording messages received over the telephone circuit, said recording unit being connectible to the telephone circuit through said auxiliary means.

19. The apparatus of claim 18 in which said office further includes
(i) command signal storage means accessible by the subscriber from a remote telephone subset by dialing a predetermined telephone number for storing a subscriber provided extended message command signal, in which said controlling means is responsive to an off-hook condition on the telephone circuit for searching said command signal storage means for an extended message command signal supplied by the subscriber and for transmitting any such extended message command signal so found over the telephone circuit, and in which said auxiliary means further includes
(ii) means responsive to the receipt of the extended message command signal from said office for preparing said auxiliary means for an incoming call from the subscriber from the remote telephone subset and for connecting said recording unit to the telephone circuit to record the message transmitted during the call.

20. The apparatus of claim 19 in which the subscriber is provided with an indentification code which is stored in said office memory means and in which said command signal storage means includes means for receiving the subscriber's identification code and for storing the subscriber supplied extended message command signal only if the received code corresponds to the code stored in said office memory means.

21. The apparatus of claim 19 in which said office further includes means for generating and transmitting over the telephone circuit a subscriber identification signal prior to the transmission of said extended message command signal and in which said auxiliary means further includes (i) a subscriber identification signal receiver means for enabling said preparing means responsive to the receipt of the subscriber identification signal.

22. The apparatus of claim 19 in which said auxiliary means further includes
(i) recording unit control means responsive to command signals transmitted over the telephone circuit during the time said recording unit is connected to the telephone circuit for controlling the mode of operation of said recording unit.

23. The apparatus of claim 19 in which said auxiliary means further includes
(i) means for normally preventing incoming calls from being received on the telephone circuit and in which said preparing means comprises means for overriding said incoming call preventing means for a predetermined limited time interval after the receipt of the extended message command signal from said office to enable the subscriber to reach the telephone circuit from the remote telephone subset to transmit the extended message.

24. The apparatus of claim 23 in which said command signal storage means includes means for storing with said extended message command signal the telephone number of the remote telephone subset from which the subscriber dialed said extended message command signal, in which said controlling means includes means, responsive to the transmission of said extended message command signal to the telephone circuit, for dialing the telephone number of the remote telephone subset from which the subscriber dialed said extended message command signal and for transmitting to the remote telephone subset a ready for message signal indicative that the incoming call can be placed to the subscriber's telephone circuit.

25. The apparatus of claim 23 in which said auxiliary means further includes
(i) busy signal generating means for generating a simulated busy signal and coupling the simulated busy signal to the telephone circuit during said predetermined limited time interval.

26. Apparatus for supervising the condition of a telephone subscriber's premises by utilizing a telephone circuit that extends from the subscriber's premises to a telephone switching office of the type that includes linefinding means for identifying the subscriber whose telephone circuit is off-hook, and memory means for storing information including information concerning the identity of the subscriber, said apparatus comprising:
(A) sensing means at the premises for detecting the occurrence of a predetermined condition at the premises;
(B) responsive to the detection of said predetermined condition by said sensing means for creating a temporary off-hook condition on the telephone circuit, the subscriber whose telephone circuit is off-hook being identified by the line-identifying means in the office;
(C) means for transmitting a reporting signal to the office over the telephone circuit during the temporary off-hook condition, said reporting signal being indicative of the nature of said predetermined condition at the premises and being such that line switching equipment at the office does not respond to it; and (D) means at the office for detecting and storing said reporting signal along with the subscriber identity in the memory means at the office.

27. The apparatus of claim 26 further including means at the office for forwarding said reporting signal and the subscriber identity to an action center designated to receive the information.

28. The apparatus of claim 26 in which there is a telephone subset at the premises connected to the subscriber's telephone circuit and in which said apparatus further includes means at the premises for disconnecting the telephone subset from the telephone circuit at the premises responsive to a prolonged off-hook condition on the telephone circuit, and means for creating a temporary on-hook condition on the circuit prior to the operation of said off-hook creating means.

29. The apparatus of claim 26 in which said off-hook creating means creates a circuit integrity off-hook condition on the telephone circuit at predetermined time periods irrespective of the detection of said predetermined condition at the premises.

30. The apparatus of claim 29 including means at the office adapted to sense the circuit integrity off-hook conditions on the telephone circuit and responsive to the absence of one or more of said circuit integrity off-hook conditions to store a circuit integrity failure signal and the subscriber identity in the memory means at the office, whereby the integrity of the telephone circuit to that subscriber is automatically monitored.

31. The apparatus of claim 29 in which said transmitting means transmits said reporting signal during one of the circuit integrity off-hook condition if said predetermined condition at the premises has been detected at that time.

32. The apparatus of claim 29 further including means at the premises for transmitting an integrity signal over the telephone circuit to the office during one of the circuit integrity off-hook conditions, the presence of which signal is indicative of the integrity of the circuit.

33. The apparatus of claim 29 further including means at the office for storing a subscriber-provided command signal, means at the office for transmitting said command signal to the telephone circuit responsive to one of said circuit integrity off-hook conditions on the telephone circuit, and means at the premises for initiating a control function at the premises responsive to the receipt of said command signal from the office.

34. The apparatus of claim 33 in which the subscriber is provided with an identification code, said apparatus further including means at the office for receiving the subscriber's identification code, said command signal transmitting means being enabled only if the subscriber's identification code is received with said command signal.

35. The apparatus of claim 33 further including means at the office for transmitting a subscriber identification signal over the telephone circuit with said command signal, said subscriber identification signal identifying the subscriber, and means at the premises for receiving the subscriber identification signal, said control function initiating means responding to said command signal from said office only if the subscriber identification signal received is received with said command signal.

36. The apparatus of claim 33 further including means at the office for preventing the transmission of said command signal to the telephone circuit during the time that one of said reporting signals is being transmitted from the premises over the telephone circuit.

37. The apparatus of claim 33 including means at the office for receiving an incoming call at the office from a telephone subset remote from the subscriber's premises, said command signal being transmitted to the office during the incoming call, and means causing said storing means to store the command signal transmitted during said call.

38. The apparatus of claim 29 in which there is a telephone subset at the premises and further including means at the office for storing a subscriber-provided command signal indicative of an extended message, means at the office for transmitting said extended message command signal to the telephone circuit in response to one of said circuit integrity off-hook conditions on the telephone circuit, means at the premises for enabling the subset to receive an incoming call from a telephone subset remote from the subscriber's premises in response to the receipt of said extended message command signal, and means at the premises for receiving the incoming call.

39. The apparatus of claim 38 further including means for normally preventing incoming calls from being received at the premises on the telephone circuit, and in which said enabling means comprises means for overriding said preventing means for a predetermined limited time interval at a predetermined time after the receipt of the extended message command signal to enable an incoming call from a telephone subset remote from the subscriber's premises to be received on the telephone circuit.

40. The apparatus of claim 39 further including means at the premises for generating a simulated busy signal and for coupling the busy signal to the telephone circuit during said predetermined time interval.

41. The apparatus of claim 38 in which the subscriber is provided with an identification code, said apparatus further including means at the office for receiving the subscriber's identification code, said extended message command signal storing means being enabled only if the subscriber's identification code is received with said command signal.

42. The apparatus of claim 38 further including means at the office for transmitting a subscriber identification signal over the telephone circuit with said command signal, said subscriber identification signal identifying the subscriber, and means at the premises for receiving the subscriber identification signal, said enabling means enabling the subscriber's subset only if the subscriber identification signal received at the premises identifies the subscriber.

43. The apparatus of claim 38 in which said extended message receiving means at the premises comprises a recording unit, and in which said apparatus further includes means at the premises for controlling the operation of said recording unit responsive to the receipt of command signals during the course of the incoming call.

44. A method of supervising the condition of a telephone subscriber's premises by utilizing a telephone circuit that extends from the subscriber's premises to a telephone switching office of the type that includes linefinding means for identifying the subscriber whose telephone circuit is off-hook, and memory means for storing information concerning the identity of the subscriber, said method comprising the steps of:

(A) detecting at the subscriber's premises the occurrence of a predetermined condition;

(B) responsive to the detection of said predetermined condition, creating a temporary off-hook condition on the telephone circuit, the subscriber whose telephone circuit is off-hook being identified by the linefinding means in the office;

(C) transmitting a reporting signal to the office over the telephone circuit during the off-hook period, said reporting signal being indicative of the nature of said predetermined condition at the premises and being such that the line switching equipment at the office does not respond to it; and (D) storing said reporting signal along with the subscriber identity in the memory means at the office.

45. The method of claim 44 further including the step operative after said storing step of forwarding said reporting signal and the subscriber identity to an action center designated to receive the information.

46. The method of claim 44 in which there is a telephone subset at the premises connected to the subscriber's telephone circuit and further including the steps of disconnecting the telephone subset from the telephone circuit at the premises responsive to a prolonged off-hook condition on the telephone circuit and creating a temporary on-hook condition on the circuit, prior to the operation of said off-hook creating step.

47. The method of claim 44 in which said off-hook creating step comprises the step of creating a circuit integrity off-hook condition on the telephone circuit at predetermined time periods irrespective of non-detection of said predetermined condition at the premises.

48. The method of claim 47 further including the steps of sensing at the office the circuit integrity off-hook conditions and, responsive to the absence of one or more of said circuit integrity off-hook conditions at said predetermined time periods, storing a circuit integrity failure signal and the subscriber identity in the memory means at the office, whereby the integrity of the telephone circuit is automatically monitored.

49. The method of claim 47 in which said reporting signal is transmitted during one of the predetermined time period off-hook conditions if said predetermined condition at the premises has been detected at that time.

50. The method of claim 47 further including the step of transmitting a signal over the telephone circuit to the office during one of the circuit integrity off-hook conditions the presence of which signal is indicative of the integrity of the circuit.

51. The method of claim 47 further including the steps of storing a subscriber-provided command signal at the office, transmitting said command signal from the office to the telephone circuit responsive to one of said circuit integrity off-hook conditions on the telephone circuit, and initiating a control function at the premises responsive to the receipt of said command signal from the office.

52. The method of claim 51 in which the subscriber is provided with an identification code, said method further including the step, operative prior to the operation of said command signal storing step, of receiving the subscriber's identification code at the office, said command signal storing step being operative only if the received identification code is valid.

53. The method of claim 51 further including the steps, operative prior to the operation of said control function initiating step, of transmitting a subscriber identification signal over the telephone circuit and receiving the subscriber identification signal at the premises, said control function initiating step being operative only if the subscriber identification signal received at the premises is valid.

54. The method of claim 51 further including the step of preventing the transmission of said command signal to the telephone circuit during the time that one of said reporting signals is being transmitted from the premises over the telephone circuit.

55. The method of claim 51 further including the step, operative prior to the operation of said command signal storing step, of receiving said command signal during an incoming call to the office from a telephone subset remote from the subscriber's premises.

56. The method of claim 47 further including the steps of storing at the office a subscriber-provided command signal indicative of an extended message, transmitting said extended message command signal from the office to the telephone circuit responsive to one of said predetermined time period off-hook conditions on the telephone circuit, preparing the telephone circuit to receive an incoming call from a telephone subset remote from the subscriber's premises responsive to the receipt of said extended message command signal, and connecting means at the premises to the telephone circuit to receive the incoming call.

57. The method of claim 56 further including the step of normally preventing incoming calls from being received on the telephone circuit, and in which said preparing step comprises the step of overriding said preventing step for a predetermined limited time interval at a predetermined time after the receipt of the extended message command signal to enable an incoming call from a telephone subset remote from the subscriber's premises to be received on the telephone circuit.

58. The method of claim 57 further including the steps of generating a simulated busy signal at the premises and coupling the busy signal to the telephone circuit during said predetermined limited time interval.

59. The method of claim 56 in which the subscriber is provided with an identification code, said method further including the step, operative prior to the operation of said extended message command signal storing step, of receiving the subscriber's identification code at the office, said extended message command signal storing step being operative only if the received identification code is valid.

60. The method of claim 56 further including the steps, operative prior to the operation of said preparing step, of transmitting a subscriber identification signal over the telephone circuit and receiving the subscriber identification signal at the premises, said preparing step being operative only if the subscriber identification signal received at the premises is valid.

61. The method of claim 56 in which the means at the premises to receive the extended message comprises a recording unit and in which said method further includes the step of controlling the operation of the recording unit at the premises responsive to the receipt of command signals during the course of the incoming call.

* * * * *